Oct. 20, 1936.   J. D. CRECCA ET AL   2,057,670
APPARATUS FOR END WELDING
Filed Jan. 13, 1934   4 Sheets-Sheet 4

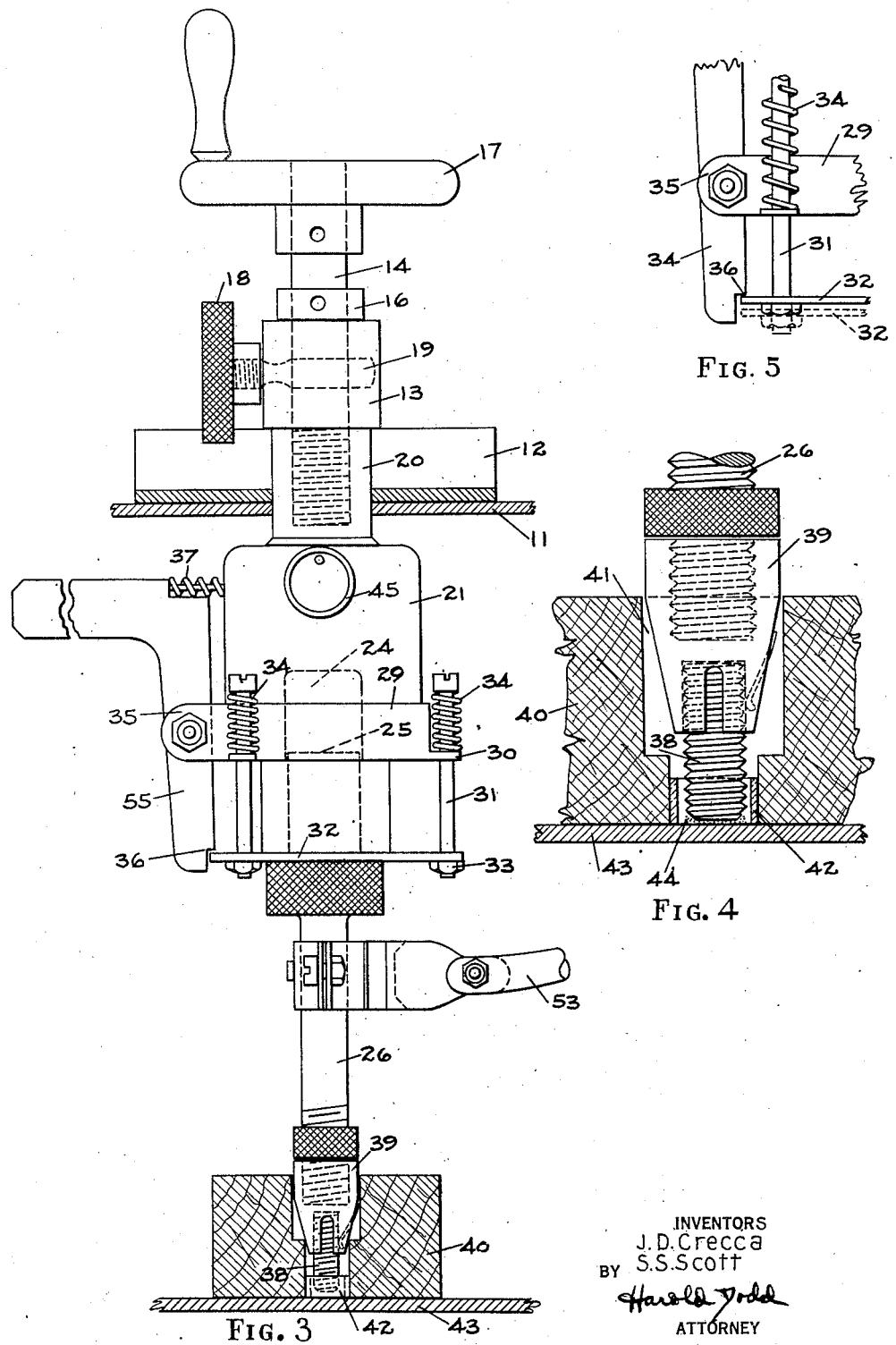

INVENTORS
J.D. Crecca
S.S. Scott
BY Harold Todd
ATTORNEY

Patented Oct. 20, 1936

2,057,670

UNITED STATES PATENT OFFICE 2,057,670

APPARATUS FOR END-WELDING

John D. Crecca, United States Navy, and Samuel S. Scott, St. Albans, N. Y.

Application January 13, 1934, Serial No. 706,510

12 Claims. (Cl. 219—4)

(Granted under the act of March 3, 1883, as amended April 30, 1928; 370 O. G. 757)

This invention relates to a device for welding the ends of elongated pieces of metal, such as studs, screws, etc., to surfaces of metal articles and relates also to the method of striking the arc between the parts to be joined.

It is the object of the present invention to provide means for performing welding operations of the type above mentioned rapidly and accurately, in a manner to effect a permanent bond between the parts so joined when the stud or other elongated piece is of too great diameter for successful hand manipulation.

A further object is to provide a material that will facilitate the striking of the arc while the piece to be welded is maintained stationary at the proper arc distance from the surface to which it is to be fixed.

In the drawings:

Fig. 3 is a side elevation of the parts shown in section in Fig. 2;

Fig. 4 is an enlarged detail view of a stud in position to be welded;

Fig. 5 is a detail of certain parts serving to position the electrode holder;

The present invention was developed to make possible the securing of deck planking to the steel decks of ships and for securing insulating sheathing and the like to metal surfaces without making holes through such surfaces and further to avoid interfering with piping, wiring, etc., on the opposite side of the plate from that to which the sheathing or planks are to be secured. We have found that in the end welding of bolts and studs of from ¼" diameter and up it is preferable to use some mechanical means for pressing the stud into the molten metal on the plate surface rather than to do so by hand, since greater pressure is required than can well be exerted manually.

The satisfactory use of a machine for the purpose mentioned requires positioning the end of the stud at a distance from the surface to which it is to be welded that is substantially the most efficient length for the welding arc. To avoid the necessity of moving the electrode to the arc-length distance after the arc has been struck we have devised a method and provided a material for initiating the arc while the electrode is held stationary at a distance from the surface to which it is to be bonded.

Figure 1:
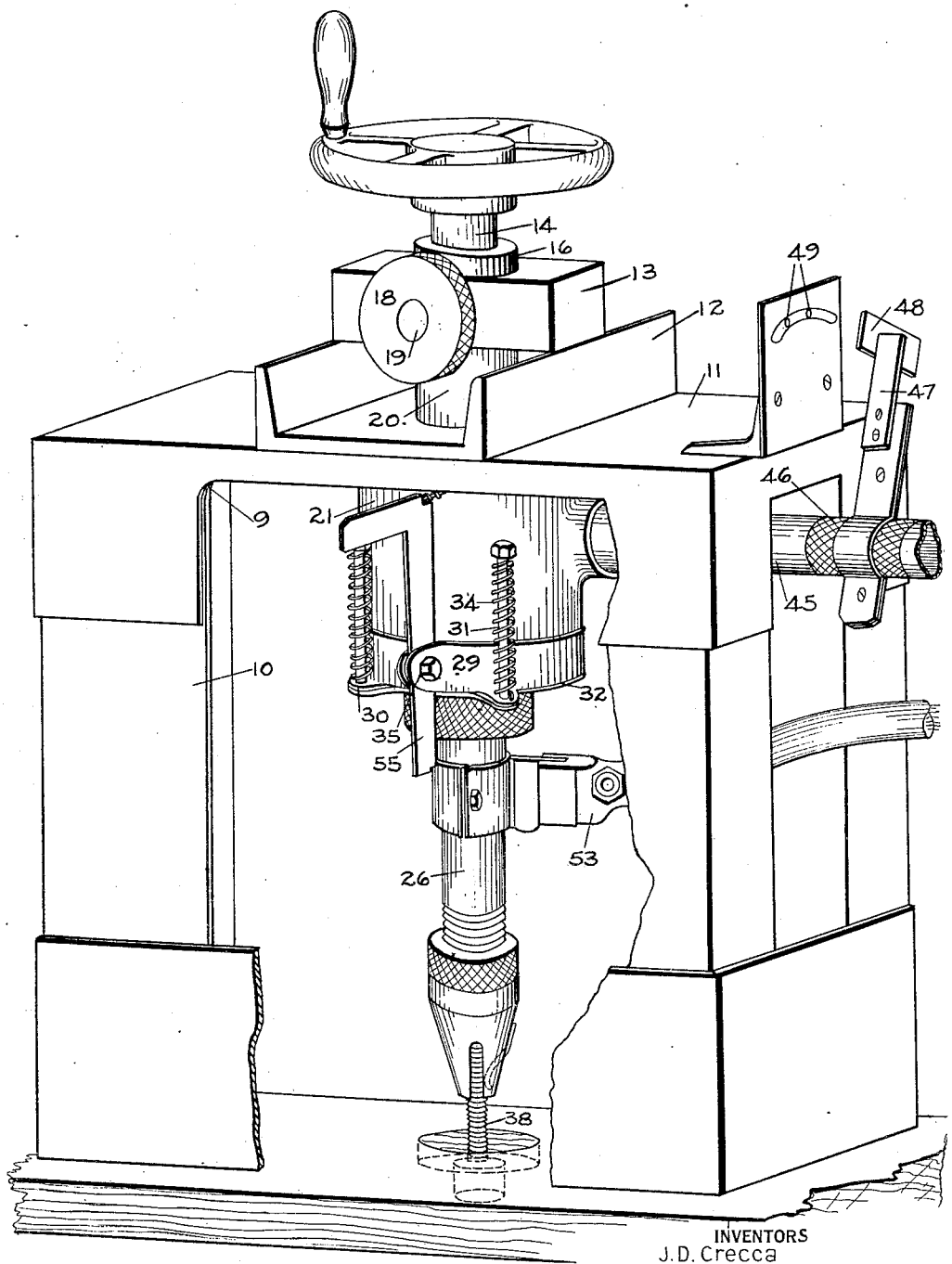
Fig. 1 is a perspective elevational view of our invention.
Figure 2:
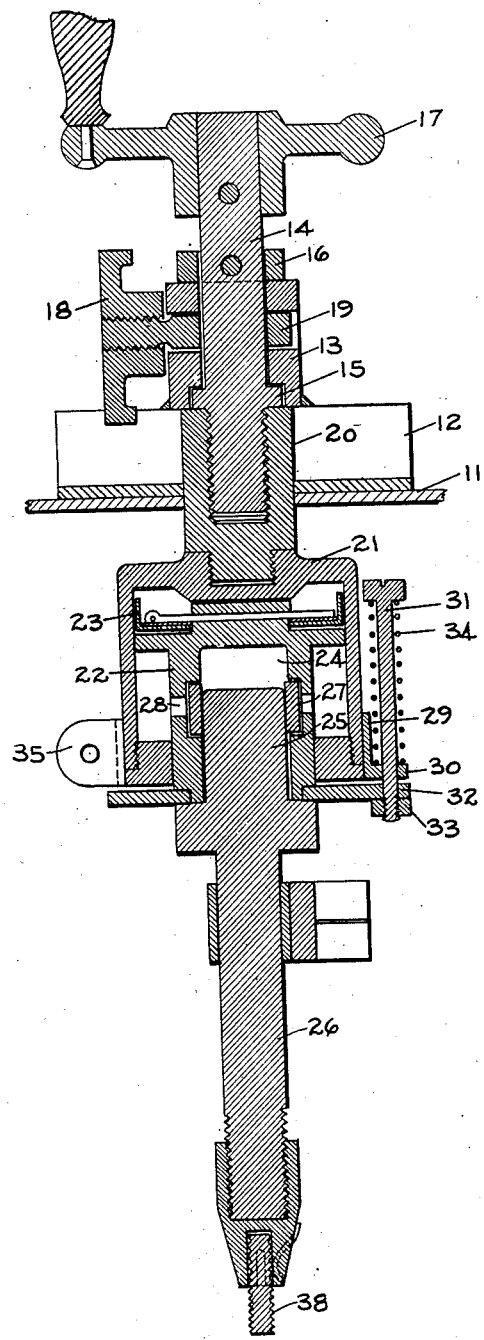
Fig. 2 is a vertical section taken on the axis of the electrode holder and the parts for operating the same.

In Fig. 1 the welding mechanism is shown mounted on a supporting structure 9 consisting of four legs 10 and a top 11 to which is secured a channel 12 with a bar 13 fixed to the edges of the flanges thereof. Shaft 14 is rotatable in the bar 13 and is prevented from moving longitudinally therein by a collar 15 integral with shaft 14 disposed in a recess in the lower face of bar 13 and a detachable collar 16 secured to shaft 14 to bear upon the upper surface of bar 13. The shaft 14 may be rotated by a hand wheel 17 fixed to the upper end thereof but is held against casual rotation by a nut 18 in threaded engagement with a portion of a locking element 19 wherein is an elongated hole through which shaft 14 passes and which is caused to bind tightly against shaft 14 by the contact of nut 18 with a face of bar 13 when the nut is screwed down.

The lower end of shaft 14 is threaded and is engaged with internal threads in the upper end of a coupling sleeve 20 which has external threads at its lower end engaged with an internally threaded boss on cylinder 21. In cylinder 21 is a piston 22 provided on its upper surface with a pressure-sealing washer 23 and having in it an axial recess 24 to receive the head 25 of electrode holder 26. The head 25 is retained in piston 22 by the frictional engagement therewith of a substantially C-shaped spring 27 seated in an annular groove in the wall of recess 24, the holes 28 through the wall of the cylinder being provided for the insertion of tools to contract spring 27 when it is desired to remove it from the cylinder.

A clamping ring 29 is adjustable longitudinally of cylinder 21 and is provided with perforated ears 30 through which pass guides 31 that are headed at their upper ends and have their lower ends passed through a ring 32 that is secured to the lower end of piston 22, where they are secured by nuts 33. A spring 34 is disposed around each guide 31 between the head thereof and the ear 30 through which the guide passes, under sufficient compression to move the piston 22 upwardly in cylinder 21 when no force is acting in opposition thereto. A lever 55 is pivotally mounted between ears 35 formed on the ends of ring 29 and has a shoulder 36 that will engage the ring 32 and limit the upward movement thereof, said lower end being held in position so to engage the ring 32 by a spring 37 carried by the upper portion of lever 55 and bearing against the side of cylinder 21. The stud 38, which constitutes one electrode, is carried by a spring chuck 39 secured to the lower end of electrode holder 26.

The ring 29 is so positioned on cylinder 21 that when a stud is seated in chuck 39 and the ring 32 is seated against shoulder 36, the lower end of the stud will be about 1/16 of an inch from the surface of the plate to which the stud is to be welded. It has been found advantageous to place the deck planking 40 provided with suitably spaced holes 41 upon the plates to which the planks are to be secured and to weld the studs to the plates at the bottom of the holes in the planking when the planks are in place, as this avoids the necessity of templating or otherwise laying out the positions of the studs. As shown in Fig. 4, a refractory sleeve 42 is placed in the hole in contact with the plate 43 to prevent charring of the wood by heat of the arc. After sleeve 42 is in place a small quantity of arc-initiating material 44 is placed upon the plate inside sleeve 42 and the stud 38, carried by electrode holder 26, is positioned at the proper distance from the surface of plate 43. The arc-initiating material acts to cause the arc to be struck as soon as the welding circuit is closed without the necessity of moving electrode 38 into contact with plate 43 and withdrawing it to the arc distance after the current has begun to flow. This is due to the fact that the potential across the arc space sets up a flux that moves the particles of the material to short circuit the gap. A material that we have found to be very satisfactory for this purpose is two parts of steel chippings and one part of aluminum filings; however, these terms are not to be taken as restrictive of the form of the metal particles since these particles may be granular, filamentary or laminar, and should be of a size larger than will pass through a number 8 mesh screen. The aluminum serves as a scavenger of oxygen and to prevent porosity of the weld, while the iron supplies additional bonding material. For welding a half-inch stud, about 150 milligrams of the arc-initiating material is sufficient; if too great a quantity be used, the molten metal will splash and may freeze on the threads of the stud. The aluminum acts as a scavenger of oxygen and so assists in forming strong, nonporous welds. The ferrous metal used should be free of oxide. Instead of making a heap of the arc initiating material upon the surface of the plate, the material may be caused to adhere to the end of the electrode by means of glue, glycerine or other adhesive.

Figure 6:
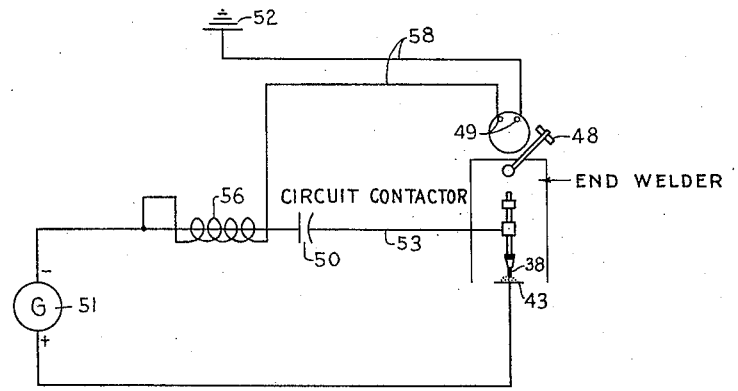
Figs. 6, 7 and 8 are schematic wiring diagrams of various circuits that may be used in the practice of our invention.
Figure 7:
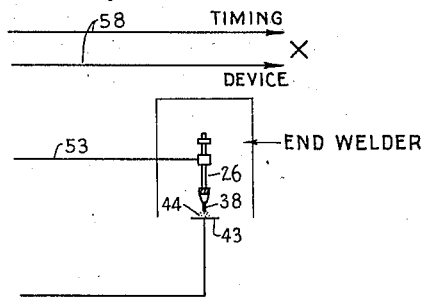
Figure 8:
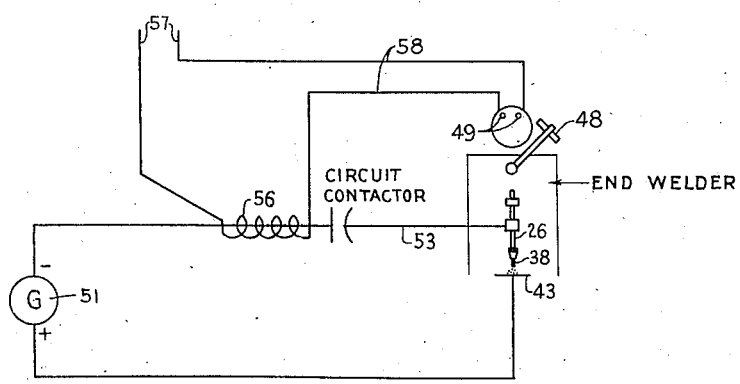

It is to be understood that the movement of piston 22 may be caused by introduction of any suitable working medium such as compressed air, steam or other fluid into cylinder 21 above the piston, or a solenoid may be substituted for the cylinder and piston. In the form of our invention illustrated, air is the medium used and is introduced through a hose 45 controlled by a valve operatively connected to the rotatable, knurled sleeve 46. Secured to sleeve 46 is an arm 47 carrying a conducting element 48 that is movable across the contacts 49 to close an electric circuit through wires 58, which may be in either the welding circuit or an auxiliary circuit. In Fig. 6 the contacts 49 and element 48 close an auxiliary circuit that energizes solenoid 56 which moves the circuit contactor 50 and closes the welding circuit through electrode 38, plate 43 and welding generator 51. In this mode of connection the auxiliary circuit receives power from the welding generator 51, the other terminal being grounded as indicated at 52. In Fig. 3 the arrangement is practically the same as in Fig. 6 except that the energy of the auxiliary circuit is drawn from an external source through wires 57. Fig. 7 shows schematically our invention in combination with a timing device that will automatically rotate sleeve 46 to cut off the welding current and move the electrode against the plate after the proper time interval, the remainder of the circuit for controlling the welding current being as in either Fig. 6 or Fig. 7. Since many such timing devices are well known and the construction thereof forms no part of the present invention, the timing mechanism is not illustrated.

The method of operation is as follows: The upper end of lever 55 is moved inwardly to permit springs 34 to lift the electrode holder 26 so that the access may be had to spring chuck 39 to insert a stud 38. The sleeve 42 is positioned in the hole in the planking and the arc inducing material 44 is placed within the sleeve or caused to adhere to the end of the stud. The stud is then inserted into the sleeve 42, the ring 32 having been placed in engagement with shoulder 36. Turning the sleeve 46 causes the element 48 to wipe across the contacts 49 and close the auxilary circuit which, in turn, closes the welding circuit and, due to the presence of the arc initiating material 44, the arc is immediately struck. A brief interval after the welding circuit has been closed, the sleeve 46 is rotated farther and opens the valve that admits working substance to cylinder 21 which forces piston 22 downwardly and jams the plastic lower end of stud 38 into the crater formed in plate 43. The dotted outline of ring 32 in Fig. 5 shows the position thereof when the stud has been forced into welding position on the plate. The welding circuit having been opened by the rotation of sleeve 46 to admit the working substance to cylinder 21, it requires but a moment for the molten and plastic metal to set sufficiently to permit the spring chuck 39 to be withdrawn without disturbing the stud, which is done by the springs 34 as soon as the pressure of the working substance in cylinder 21 is released.

The element 48 and contacts 49 may be used to close the circuit directly through the cable 53 that carries the welding current to electrode holder 26 but it is safer to have the relatively low power of the auxiliary circuit controlled thereby.

Adjustment of the position of electrode holder 26 to permit the use of studs of different lengths is effected by means of hand wheel 17. It is obvious that since shaft 14 can not move longitudinally, rotation thereof will cause the coupling 20 to be moved up or down on the threaded lower end of shaft 14 and hence the position of cylinder 21 may be varied with respect to the supporting structure 9.

The invention herein described may be manufactured and used by or for the Government of the United States of America for governmental purposes without the payment of any royalty thereon.

We claim:

1. An end-welding device, comprising, in combination, a supporting structure, a shaft supported thereby to be rotatable but not longitudinally movable, said shaft having an externally threaded end, means to rotate said shaft, releasable means to lock said shaft against rotation, a coupling having internal threads engaged with the threads on said shaft and external threads, a cylinder having a portion engaged with the external threads on said coupling, a piston slidable in said cylinder, an electrode holder carried by said piston, means connected to said holder to include said holder in a welding circuit, means operatively related to said piston normally tending to move said piston into said cylinder, means engageable with a portion of said means to position the electrode holder at the proper distance from a surface to which a weld is to be made, means to control the flow of working substance to said cylinder, means to close the welding circuit and common means for actuating said control means and said circuit closing means.

2. An end-welding device comprising, in combination, a supporting structure, a shaft supported thereby to be rotatable but not longitudinally movable, means to rotate said shaft, releasable means to lock said shaft against rotation, a coupling engaged with said shaft to be moved longitudinally by rotation of said shaft, a cylinder connected to said coupling to be moved therewith, a piston slidable in said cylinder, an electrode holder carried by said piston, means connected to said holder to include said holder in a welding circuit, means operatively related to said piston normally tending to move said piston into said cylinder, means engageable with a portion of said means to position the electrode holder at the proper distance from a surface to which a weld is to be made, means to control the flow of a working substance to said cylinder, means to close the welding circuit and common means for actuating said control means and said circuit closing means.

3. An end-welding device, comprising, in combination, a supporting structure, a cylinder, means to support said cylinder from said structure, said means being adjustable to vary the position of said cylinder with respect to said structure, a piston in said cylinder, an electrode holder carried by said piston, a substantially plane annular member of greater diameter than said cylinder secured to the outer end of said piston, a clamping ring mounted on said cylinder, said ring having laterally extending apertured ears, headed guide members passing through said ears and said annular member, a spring on each said guide under compression between a head thereof and the respective ear on said clamping ring, a lever carried by said ring having in its lower end a notch to engage said annular member and at its upper end a spring to move said upper end away from the cylinder, means to supply current to said electrode holder and means to supply working substance to said cylinder.

4. An end-welding device, comprising, in combination, a supporting structure, a cylinder, means to support said cylinder from said structure, said means being adjustable to vary the position of said cylinder with respect to said structure, a piston in said cylinder, an electrode holder carried by said piston, means tending normally to move said piston into said cylinder, a member engageable with a portion of said means to prevent movement of said piston into said cylinder beyond a predetermined point, means to supply current to said electrode holder and means to supply working substance to said cylinder.

5. An end-welding device, comprising, in combination, a supporting structure, a cylinder, means to support said cylinder from said structure, said means being adjustable to vary the position of said cylinder with respect to said structure, a piston in said cylinder, an electrode holder carried by said piston, means tending normally to move said piston into said cylinder, a member engageable with a portion of said means to prevent movement of said piston into said cylinder beyond a predetermined point, means to control the supply of current to said electrode holder, means to control the supply of working substance to said cylinder, and means connected to actuate said current supply means to close the circuit through said electrode holder and upon further movement to actuate said working substance control means to admit working substance to said cylinder.

6. An end-welding device, comprising, in combination, a supporting structure, an electrode holder, means to support said electrode holder from said structure, said means being adjustable to vary the position of said holder with respect to said structure, means to position said holder at the correct distance from a surface to which a weld is to be made, mechanical means to move said holder toward said surface, means to supply current to said holder, and an element so connected that movement thereof in one direction closes the circuit through said current supply means and further movement in the same direction causes the actuation of said mechanical means.

7. An end-welding device, comprising, in combination, a supporting structure, a cylinder, means to support said cylinder from said structure, a piston in said cylinder, an electrode holder carried by said piston, a substantially plane annular member of greater diameter than said cylinder secured to the outer end of said piston, a clamping ring mounted on said cylinder, said ring having laterally extending apertured ears, headed guide members passing through said ears and said annular member, a spring on each said guide under compression between a head thereof and the respective ear on said clamping ring, a lever carried by said ring having in its lower end a notch to engage said annular member and at its upper end a spring to move said upper end away from the cylinder, means to supply current to said electrode holder and means to supply working substance to said cylinder.

8. An end-welding device, comprising, in combination, a supporting structure, a cylinder, means to support said cylinder from said structure, a piston in said cylinder, an electrode holder carried by said piston, means tending normally to move said piston into said cylinder, a member engageable with a portion of said means to prevent movement of said piston into said cylinder beyond a predetermined point, means to supply current to said electrode holder and means to supply working substance to said cylinder.

9. An end-welding device, comprising, in combination, a supporting structure, a cylinder, means to support said cylinder from said structure, a piston in said cylinder, an electrode holder carried by said piston, means tending normally to move said piston into said cylinder, a member engageable with a portion of said means to prevent movement of said piston into said cylinder beyond a predetermined point, means to control the supply of current to said electrode holder, means to control the supply of working substance to said cylinder, and means connected to actuate said current supply means to close the circuit through said electrode holder and upon further movement to actuate said working substance control means to admit working substance to said cylinder.

10. An end-welding device, comprising, in combination, a supporting structure, an electrode holder, means to support said electrode holder from said structure, means to position said holder at the correct distance from a surface to which a weld is to be made, mechanical means to move said holder toward said surface, means to supply current to said holder, and an element so connected that movement thereof in one direction closes the circuit through said current supply means and further movement in the same direction causes the actuation of said mechanical means.

11. An end-welding device, comprising, in combination, a supporting structure, an electrode holder, means to support said electrode holder from said structure, mechanical means to move said holder toward said surface, means to supply current to said holder, and an element so connected that movement thereof in one direction closes the circuit through said current supply means and further movement in the same direction causes the actuation of said mechanical means.

12. An end-welding device, comprising, in combination, a supporting structure, a cylinder, means to support said cylinder from said structure, a piston in said cylinder, an electrode holder carried by said piston, a substantially plane annular member of greater diameter than said cylinder secured to the outer end of said piston, a clamping ring mounted on said cylinder, said ring having laterally extending apertured ears, headed guide members passing through said ears and said annular member, a spring on each said guide under compression between a head thereof and the respective ear on said clamping ring, means to supply current to said electrode holder, and means to supply working substance to said cylinder.

JOHN D. CRECCA.
SAMUEL S. SCOTT.